United States Patent
Chen (10) Patent No.: US 11,250,392 B2
(45) Date of Patent: *Feb. 15, 2022

(54) DATA PROCESSING METHODS, APPARATUSES, AND TERMINAL DEVICES

(71) Applicant: Advanced New Technologies Co., Ltd., Grand Cayman (KY)

(72) Inventor: Cheng Chen, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 17/340,468

(22) Filed: Jun. 7, 2021

(65) Prior Publication Data
US 2021/0295281 A1 Sep. 23, 2021

Related U.S. Application Data

(63) Continuation of application No. 17/083,415, filed on Oct. 29, 2020, now Pat. No. 11,042,847, which is a
(Continued)

(30) Foreign Application Priority Data

Jul. 27, 2018 (CN) .......................... 201810839423.0

(51) Int. Cl.
*G06Q 20/32* (2012.01)
*G06Q 20/40* (2012.01)
(Continued)

(52) U.S. Cl.
CPC ......... *G06Q 20/047* (2020.05); *G06F 3/0481* (2013.01); *G06Q 20/3274* (2013.01); *G06Q 20/401* (2013.01)

(58) Field of Classification Search
None
See application file for complete search history.

(56) References Cited

U.S. PATENT DOCUMENTS

2010/0033572 A1 2/2010 Treia
2012/0221474 A1 8/2012 Eicher et al.
(Continued)

FOREIGN PATENT DOCUMENTS

CN 1452131 10/2003
CN 203350948 12/2013
(Continued)

OTHER PUBLICATIONS

PCQ Bureau, pcquest.com [online], "How to use Ridlr app for a hassle-free Mumbai Metro Ride," Feb. 6, 2018, retrieved on Sep. 20, 2021, retrieved from URL<https://www.pcquest.com/use-ridlr-app-hassle-free-mumbai-metro-ride/>, 5 pages.
(Continued)

*Primary Examiner* — Joseph W. King
(74) *Attorney, Agent, or Firm* — Fish & Richardson P.C.

(57) ABSTRACT

A computer-implemented method includes providing, by one or more processing devices, a service code management interface; receiving, by the one or more processing devices, a specified quantity that is input by a user in the service code management interface; generating, by the one or more processing devices, the specified quantity of service codes, wherein the specified quantity of service codes comprise the same user identification information; and displaying, by the one or more processing devices, the specified quantity of service codes.

20 Claims, 8 Drawing Sheets

Related U.S. Application Data continuation of application No. PCT/CN2019/094875, filed on Jul. 5, 2019.

(51) Int. Cl.
*G06F 3/0481* (2013.01)
*G06Q 20/04* (2012.01)

(56) References Cited

U.S. PATENT DOCUMENTS

| | | | |
|---|---|---|---|
| 2015/0178721 | A1 | 6/2015 | Pandiarajan et al. |
| 2017/0140315 | A1 | 5/2017 | Cao et al. |
| 2019/0279326 | A1 | 9/2019 | Chen et al. |
| 2020/0012999 | A1 | 1/2020 | Kang et al. |

FOREIGN PATENT DOCUMENTS

| | | |
|---|---|---|
| CN | 104700260 | 6/2015 |
| CN | 104915831 | 9/2015 |
| CN | 105630319 | 6/2016 |
| CN | 106250956 | 12/2016 |
| CN | 106447328 | 2/2017 |
| CN | 106453846 | 2/2017 |
| CN | 106600716 | 4/2017 |
| CN | 106846506 | 6/2017 |
| CN | 107038562 | 8/2017 |
| CN | 107451902 | 12/2017 |
| CN | 107609856 | 1/2018 |
| CN | 108022162 | 5/2018 |
| CN | 207440837 | 6/2018 |
| CN | 109118205 | 1/2019 |
| TW | 201232432 | 8/2012 |

OTHER PUBLICATIONS

Crosby et al., "BlockChain Technology: Beyond Bitcoin," Sutardja Center for Entrepreneurship & Technology Technical Report, Oct. 16, 2015, 35 pages.
Extended European Search Report in European Application No. 19842137.2, dated May 4, 2021, 9 pages.
Nakamoto, "Bitcoin: A Peer-to-Peer Electronic Cash System," www.bitcoin.org, 2005, 9 pages.
PCT International Preliminary Report on Patentability in International Application No. PCT/CN2019/094875, dated Feb. 2, 2021, 9 pages (with English translation).
PCT International Search Report and Written Opinion in International Application No. PCT/CN2019/094875, dated Oct. 9, 2019, 11 pages (with partial English translation).

DATA PROCESSING METHODS, APPARATUSES, AND TERMINAL DEVICES

CROSS-REFERENCE TO RELATED APPLICATIONS

This application is a continuation of U.S. patent application Ser. No. 17/083,415, filed on Oct. 29, 2020 which is a continuation of PCT Application No. PCT/CN2019/094875, filed on Jul. 5, 2019, which claims priority to Chinese Patent Application No. 201810839423.0, filed on Jul. 27, 2018, and each application is hereby incorporated by reference in its entirety.

TECHNICAL FIELD

Embodiments of the present specification relate to the field of computer technologies, and in particular, to data processing methods, apparatuses, and terminal devices.

BACKGROUND

With the continuous development of mobile payment technologies, mobile payment is gradually changing people's daily travel modes. More public transportation is beginning to support mobile payment. Users can use two-dimensional codes generated by mobile terminals to take public transportation. Specifically, when taking public transportation, a user can use a mobile terminal to generate a two-dimensional code, scan the code at an entry station, and scan the code at an exit station, thereby completing the payment. In related technologies, a mobile terminal can generate only one two-dimensional code each time for one user to take public transportation. As such, when multiple persons traveling together take public transportation and one of them makes payment, the user usually needs to perform the operation multiple times so that the mobile terminal generates multiple two-dimensional codes. Consequently, user operations are cumbersome and user experience is poor.

SUMMARY

A purpose of embodiments of the present specification is to provide data processing methods, apparatuses, and terminal devices, so as to simplify user operations and improve user experience.

To achieve the previous purpose, some embodiments of the present specification provide a data processing method, including the following: providing a service code management interface; receiving a specified quantity that is input by a user in the service code management interface; generating the specified quantity of service codes, where the specified quantity of service codes include the same user identification information; and displaying the specified quantity of service codes.

To achieve the previous purpose, some embodiments of the present specification provide a data processing apparatus, including the following: a providing unit, configured to provide a service code management interface; a receiving unit, configured to receive a specified quantity that is input by a user in the service code management interface; a generating unit, configured to generate the specified quantity of service codes, where the specified quantity of service codes include the same user identification information; and a displaying unit, configured to display the specified quantity of service codes.

To achieve the previous purpose, some embodiments of the present specification provide a terminal device, including the following: a displaying component, configured to display a service code management interface and a service code; and a processor, coupled to the displaying component, and configured to: control the displaying component to display the service code management interface; receive a specified quantity that is input by a user in the service code management interface; generate the specified quantity of service codes, where the specified quantity of service codes include the same user identification information; and control the displaying component to display the specified quantity of service codes.

It can be seen from the technical solutions provided in the previous embodiments of the present specification that, in some embodiments of the present specification, the mobile terminal can provide the service code management interface; can receive the specified quantity that is input by the user in the service code management interface; can generate the specified quantity of service codes, where the specified quantity of service codes include the same user identification information; and can display the specified quantity of service codes. As such, when multiple persons traveling together take public transportation and one of them makes payment, the user performs the operation once so that the mobile terminal generates multiple service codes, thereby simplifying user operations and improving user experience.

BRIEF DESCRIPTION OF DRAWINGS

To describe the technical solutions in some embodiments of the present specification or in the existing technology more clearly, the following briefly describes the accompanying drawings needed for describing some embodiments or the existing technology. Clearly, the accompanying drawings in the following descriptions merely show some embodiments of the present specification, and a person of ordinary skill in the art can still derive other drawings from these accompanying drawings without creative efforts.

DESCRIPTION OF EMBODIMENTS

The following clearly describes the technical solutions in some embodiments of the present specification with reference to the accompanying drawings in some embodiments of the present specification. Clearly, the described embodiments are merely some but not all of some embodiments of the present specification. All other embodiments obtained by a person of ordinary skill in the art based on some embodiments of the present specification without creative efforts shall fall within the protection scope of the present specification.

Some embodiments of the present specification provide a data processing system. The data processing system can implement a public transportation charging service. For example, the public transportation corresponding to the public transportation charging service can be a metro, a bus, a tram, a high-speed railway, etc. Specifically, the public transportation charging service can be a segmented charging service or a one ticket price charging service.

In some embodiments, the data processing system can include a mobile terminal. The mobile terminal can have a service code generation function. A service code can include a graphical code, and the graphical code can include a bar code, a two-dimensional code, etc. The mobile terminal can be implemented in a form of hardware or software, or can be implemented in a form of a combination of hardware and software. For example, the mobile terminal can be a hardware device such as a smartphone, a tablet electronic device, a portable computer, a personal digital assistant (PDA), or a smart wearable device. The mobile terminal can also be an application program running on the hardware device.

In some embodiments, the data processing system can further include a station-entry toll terminal. The station-entry toll terminal can have a service code scanning and recognition function. The station-entry toll terminal can be implemented in a form of hardware or software, or can be implemented in a form of a combination of hardware and software. For example, the station-entry toll terminal can be a hardware device such as a smartphone, a tablet electronic device, a portable computer, a personal digital assistant (PDA), an in-vehicle device, a POS machine (such as a merchant POS machine, a bus POS machine, or a metro POS machine), or a smart self-service terminal (kiosk) (such as a metro ticket vending machine or a train ticket vending machine). The station-entry toll terminal can also be an application program running on the hardware device.

In some embodiments, the data processing system can further include a station-exit toll terminal. The station-exit toll terminal can have a service code scanning and recognition function. The station-exit toll terminal can be implemented in a form of hardware or software, or can be implemented in a form of a combination of hardware and software. For example, the station-exit toll terminal can be a hardware device such as a smartphone, a tablet electronic device, a portable computer, a personal digital assistant (PDA), an in-vehicle device, a POS machine (such as a merchant POS machine, a bus POS machine, or a metro POS machine), or a smart self-service terminal (kiosk) (such as a metro ticket vending machine or a train ticket vending machine). The station-exit toll terminal can also be an application program running on the hardware device. It is worthwhile to note that, the station-exit toll terminal and the station-entry toll terminal can be the same or different. For example, when the public transportation corresponding to the public transportation charging service is metro, the station-exit toll terminal and the station-entry toll terminal can be different terminals. When the public transportation corresponding to the public transportation charging service is bus, the station-exit toll terminal and the station-entry toll terminal can be the same terminal.

In some embodiments, the data processing system can further include a charging server. The charging server can communicate with the station-entry toll terminal and the station-exit toll terminal. The charging server can be a server, or a server cluster that includes multiple servers.

In some embodiments, the data processing system can further include a payment server. The payment server can communicate with the mobile terminal. The payment server can be a server, or a server cluster that includes multiple servers.

Some embodiments of the present specification provide a data processing method. The data processing method is implemented by the data processing system.

In some embodiments, the mobile terminal can provide a service code management interface. The mobile terminal can receive a specified quantity that is input by a user in the service code management interface; can generate the specified quantity of service codes; and can display the specified quantity of service codes. Specifically, the specified quantity can be multiple. Each service code can include user identification information. For example, the user identification information can be a user account, a code of the user account, or any other form of information that can be used to deduce the user account. For example, the user account can be an ALIPAY account, a WeChat account, a bus card number, a metro card number, an all-in-one city card number, etc. The user identification information included in the specified quantity of service codes can be the same. Each service code can represent one service order initiated by the mobile terminal. Each service code can include order identification information, and the order identification information can be used to identify a service order represented by the service code. Order identification information in different service codes can be different.

In some embodiments, after arriving at the entry station, the user can use a service code that has not been scanned and recognized by the station-entry toll terminal for code scanning by the station-entry toll terminal at the entry station, so as to take public transportation at the entry station. Considering that the mobile terminal can display multiple service codes, the user can perform code scanning multiple times, so that multiple persons (for example, the user and the user's parents, etc.) traveling together take public transportation at the entry station. A quantity of times the user scans the code can be less than or equal to the specified quantity. Each time the user scans a service code, the station-entry toll terminal can obtain the service code through scanning; can identify the service code to obtain user identification information and order identification information; and can send the user identification information, the order identification information, and entry station information to the charging server. The entry station information can be used to identify the entry station, and can be, for example, a name or a number of the entry station. The charging server can receive the user identification information, the order identification information, and the entry station information, so as to charge a user account corresponding to the user identification information.

In some embodiments, after arriving at the exit station, the user can use the service code that has been scanned and recognized by the station-entry toll terminal but has not been scanned and recognized by the station-exit toll terminal for code scanning by the station-exit toll terminal at the exit station, so as to leave the exit station. Considering that multiple persons traveling together may not leave at the same exit station, the user can perform code scanning once or multiple times, so that one or more of the multiple persons traveling together leave the exit station. Each time the user scans a service code, the station-exit toll terminal can obtain the service code through scanning; can identify the service code to obtain user identification information and order identification information; and can send the user identification information, the order identification information, and exit station information to the charging server. The exit station information can be used to identify the exit station, and can be, for example, a name or a number of the exit station. The charging server can receive the user identification information, the order identification information, and the exit station information; can determine a charging amount based on the previously received entry station information that corresponds to both the user identification information and the order identification information, and a charging rule; and can send a payment request to the payment server. The payment request can include the user identification information, the order identification information, and the charging amount. Certainly, the payment request can further include other information, such as payee account information. The payment server can receive the payment request; can deduct money from a user account corresponding to the user identification information based on the charging amount; and can send payment result information to the mobile terminal. The payment result information can include the order identification information. Certainly, the payment result information can further include other information, such as the user identification information and/or the charging amount.

Further references can be made to FIG. 1, FIG. 4, FIG. 5, FIG. 6, FIG. 7, and FIG. 8. Some embodiments of the present specification further provide another data processing method. The data processing method can be performed by a mobile terminal. The data processing method can include the following steps.

Figure 1:
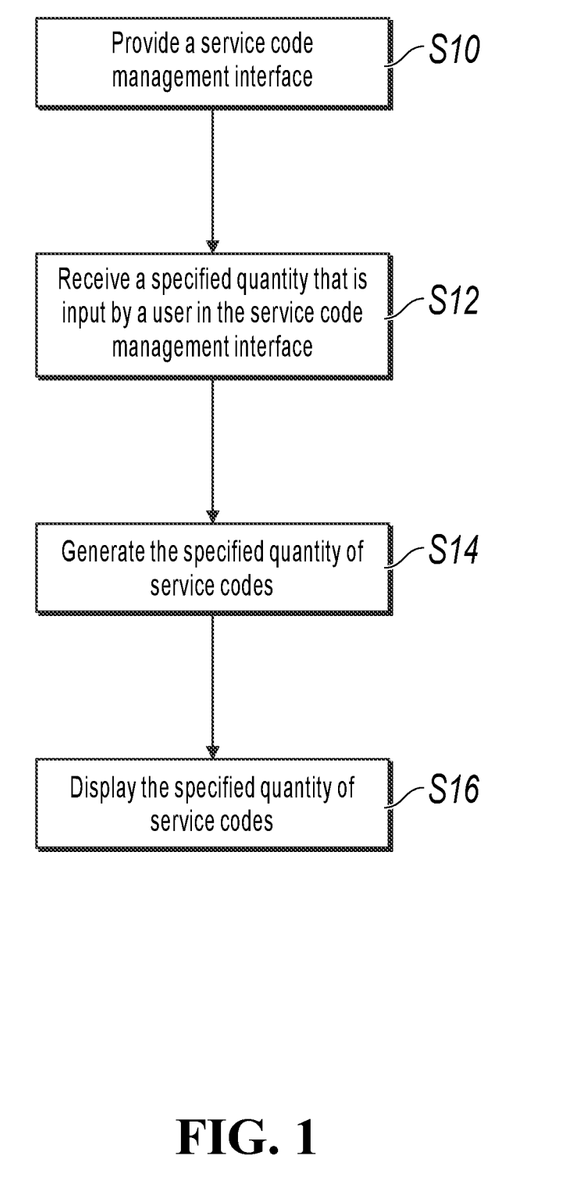
FIG. 1 is a flowchart illustrating a data processing method, according to some embodiments of the present specification.

Step S10: Provide a service code management interface.

In some embodiments, the service code management interface can be provided by the mobile terminal for a user to set a quantity of service codes to be generated. The mobile terminal can display the service code management interface after receiving an interface display instruction.

The interface display instruction can be automatically generated by the mobile terminal. For example, the mobile terminal can run an application program. After the application program is started, the interface display instruction can be generated by default.

Alternatively, the interface display instruction can be generated through triggering by a user operation. For example, the mobile terminal can generate the interface display instruction after detecting that one or any combination of multiple specified keys is pressed, tapped, double-tapped, or swiped. The specified key can be a virtual key or a physical key. For example, references are made to FIG. 4, the virtual key 402 can be a button control or a graphic control, etc. The physical key can be a press button, a rocker button, a dial, a slider switch, or a joystick, etc. For another example, the mobile terminal can further generate the interface display instruction after recognizing a predetermined gesture. For example, the predetermined gesture can be swiping left, swiping right, etc. For another example, the mobile terminal can have a gyroscope and/or an acceleration sensor. The mobile terminal can further generate the interface display instruction after detecting a predetermined motion state by using a gyroscope and/or an acceleration sensor. For example, the predetermined motion state can be shaking, etc.

Step S12: Receive a specified quantity that is input by a user in the service code management interface.

In some embodiments, the specified quantity can be a quantity of service codes to be generated by the mobile terminal. Specifically, the specified quantity can be multiple, for example, two, three, or five. The mobile terminal can receive, in any method, the specified quantity that is input by the user in the service code management interface. For example, references are made to FIG. 5, the service code management interface 502 can include a text box 504. The user can input the specified quantity in the text box 504. The mobile terminal can receive the specified quantity that is input by the user in the text box 504. For another example, the user can input first audio information in the service code management interface. The mobile terminal can receive the first audio information that is input by the user; and can recognize the first audio information to obtain the specified quantity.

Step S14: Generate the specified quantity of service codes.

In some embodiments, for the description of the service code, references can be made to the previous embodiments. The mobile terminal can generate the specified quantity of service codes after receiving a service code generation instruction. A process of generating the service code generation instruction can be similar to a process of generating the interface display instruction. The mobile terminal can generate the specified quantity of service codes by using a service code generation algorithm. Depending on different generated service codes, the service code generation algorithms can be the same or different. For example, when a two-dimensional code is generated, the service code generation algorithm can be a quick response code (QR code) algorithm. A person skilled in the art should understand that, the QR code algorithm here is only an example, and in fact any algorithm that can generate a two-dimensional code can be applied here. Certainly, when other service codes are generated, the service code generation algorithm can also be other algorithms, which are not listed here one by one. In addition, the mobile terminal can generate the specified quantity of service codes offline. Alternatively, the mobile terminal can generate the specified quantity of service codes by interacting with a payment server online. For the description of the payment server, references can be made to the previous embodiments.

Step S16: Display the specified quantity of service codes.

In some embodiments, the mobile terminal can display the specified quantity of service codes in any method. For example, references are made to FIG. 6, the mobile terminal can provide a service code display interface 602; and can display the specified quantity of service codes 604, 606, 608, 610 in the service code display interface 602.

Figure 7:
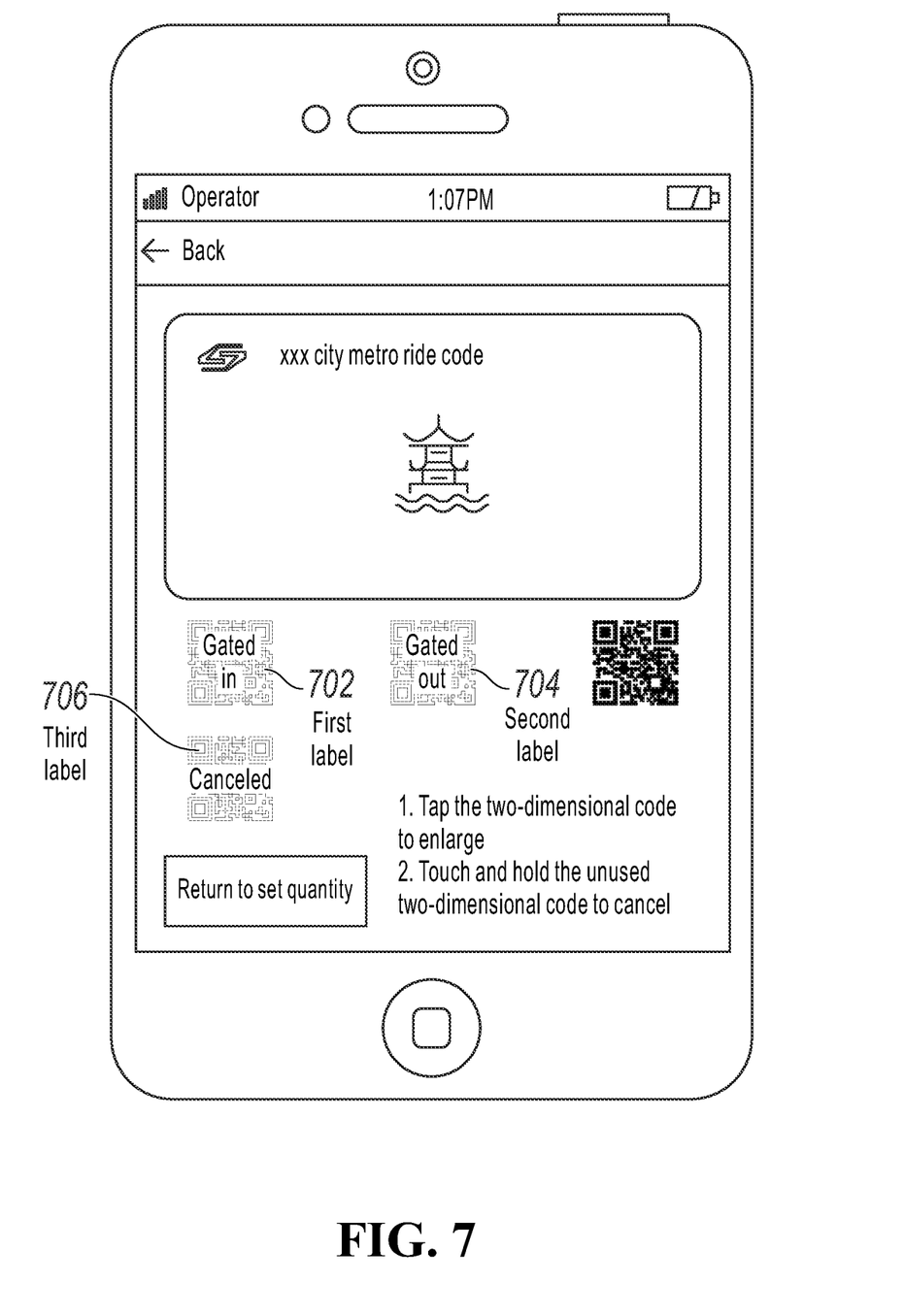
FIG. 7 is a schematic diagram illustrating a label, according to some embodiments of the present specification.

References are made to FIG. 7, in some implementations of some embodiments, after receiving a first label generation instruction for a first service code, the mobile terminal can generate a first label 702 for the first service code; and can display the first label 702. The first service code can include a service code that has been scanned and recognized by the station-entry toll terminal but has not been scanned and recognized by the station-exit toll terminal. The first label 702 can be used to indicate that a service order represented by the first service code is in a charging state. For example, the first label 702 can be "entered".

The first label generation instruction can be generated through triggering by a user operation. For example, the user can trigger the service code that has been scanned and recognized by the station-entry toll terminal but has not been scanned and recognized by the station-exit toll terminal. After detecting the trigger operation, the mobile terminal can use a service code corresponding to the trigger operation as a first service code; and can generate a first label generation instruction for the first service code. For example, the trigger operation can include a tap operation, a double-tap operation, a press operation, a swipe operation, an operation of pressing and holding for more than a predetermined time (also referred to as a touch and hold operation), etc.

Alternatively, the first label generation instruction can be generated after tolling start information sent by the payment server is received. Specifically, the user can use a service code that has not been scanned and recognized by the station-entry toll terminal for code scanning by the station-entry toll terminal at the entry station. The station-entry toll terminal can obtain the service code through scanning; can identify the service code to obtain user identification information and order identification information; and can send the user identification information, the order identification information, and entry station information to the charging server. The charging server can receive the user identification information, the order identification information, and the entry station information; and can send the tolling start information to the payment server. The tolling start information can include the order identification information. Certainly, the tolling start information can further include other information, such as the user identification information and/or the entry station information. The payment server can receive the tolling start information; and can send the tolling start information to the mobile terminal. The mobile terminal can receive the tolling start information; can use a service code that includes the order identification information in the tolling start information as a first service code; and can generate a first label generation instruction for the first service code.

In some implementations of some embodiments, after receiving a second label generation instruction for a second service code, the mobile terminal can generate a second label 704 for the second service code; and can display the second label 704. The second service code 704 can include a service code that has been scanned and recognized by the station-exit toll terminal. The second label 704 can be used to indicate that a service order represented by the second service code is in a payment end state. For example, the second label 704 can be "exited".

The second label generation instruction can be generated through triggering by a user operation. For example, the user can trigger the service code that has been scanned and recognized by the station-exit toll terminal. After detecting the trigger operation, the mobile terminal can use a service code corresponding to the trigger operation as a second service code; and can generate a second label generation instruction for the second service code. For example, the trigger operation can include a tap operation, a double-tap operation, a press operation, a swipe operation, an operation of pressing and holding for more than a predetermined time (also referred to as a touch and hold operation), etc.

Alternatively, the second label generation instruction can be generated after payment result information sent by the payment server is received. Specifically, the user can use the service code that has been scanned and recognized by the station-entry toll terminal but has not been scanned and recognized by the station-exit toll terminal for code scanning by the station-exit toll terminal at the exit station. The station-exit toll terminal can obtain the service code through scanning; can identify the service code to obtain user identification information and order identification information; and can send the user identification information, the order identification information, and exit station information to the charging server. The charging server can receive the user identification information, the order identification information, and the exit station information; can determine a charging amount based on the previously received entry station information that corresponds to both the user identification information and the order identification information, and a charging rule; and can send a payment request to the payment server. The payment request can include the user identification information, the order identification information, and the charging amount. The payment server can receive the payment request; can deduct money from a user account corresponding to the user identification information based on the charging amount; and can send payment result information to the mobile terminal. The payment result information can include the order identification information. The mobile terminal can receive the payment result information; can use a service code that includes the order identification information in the payment result information as a second service code; and can generate a second label generation instruction for the second service code.

In some implementations of some embodiments, after receiving a third label generation instruction for a third service code, the mobile terminal can generate a third label 706 for the third service code; and can display the third label 706. The third service code can include a service code that has not been scanned and recognized by the station-entry toll terminal. The third label 706 can be used to indicate that a service order represented by the third service code is in a canceled state. For example, the third label 706 can be "canceled".

The third label generation instruction can be generated through triggering by a user operation. For example, the user can trigger the service code that has not been scanned and recognized by the station-entry toll terminal. After detecting the trigger operation, the mobile terminal can use a service code corresponding to the trigger operation as a third service code; and can generate a third label generation instruction for the third service code. For example, the trigger operation can include a tap operation, a double-tap operation, a press operation, a swipe operation, an operation of pressing and holding for more than a predetermined time (also referred to as a touch and hold operation), etc.

Figure 8:
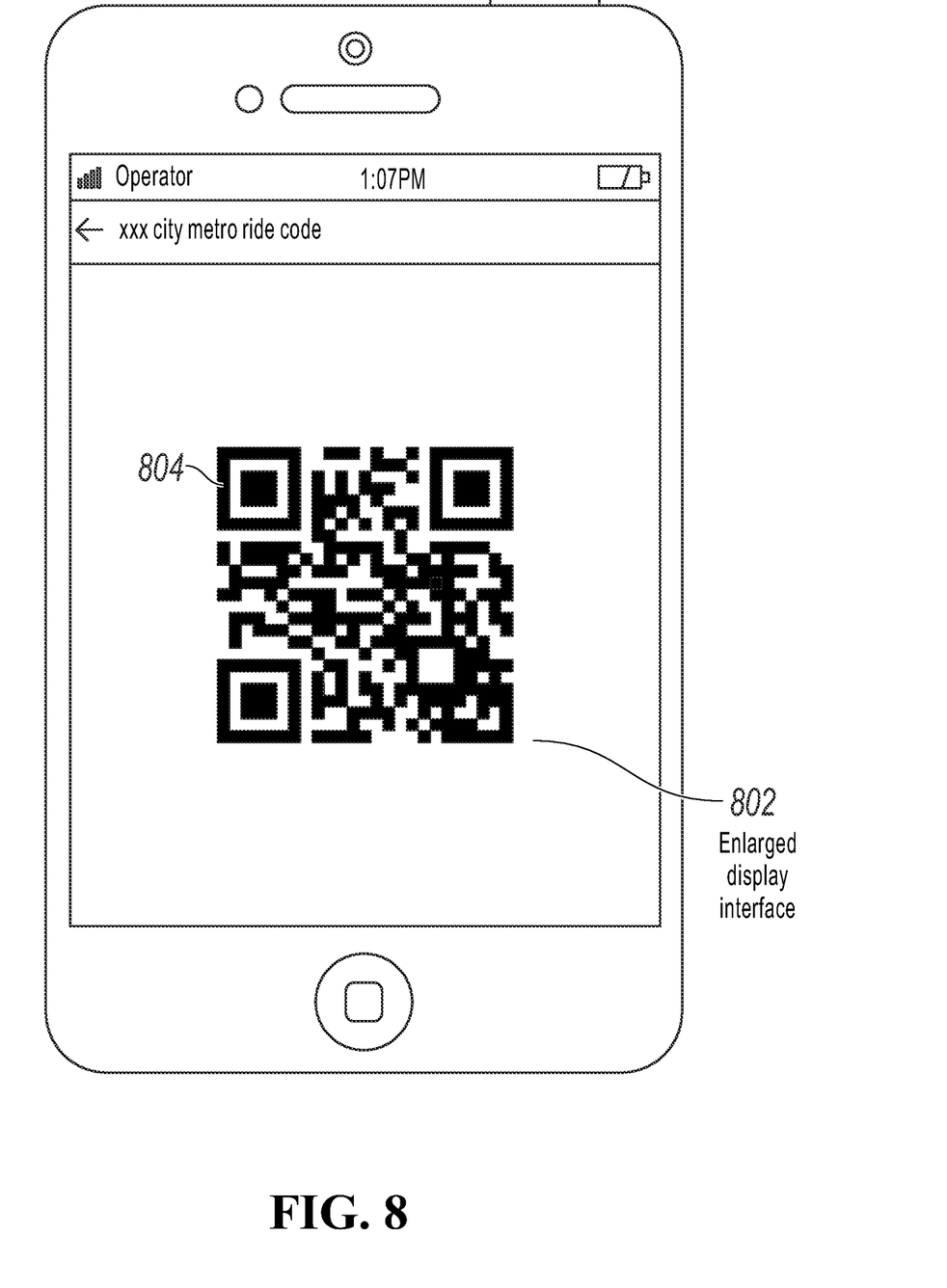
FIG. 8 is a schematic diagram illustrating an enlarged display interface, according to some embodiments of the present specification.

References are made to FIG. 8, in some implementations of some embodiments, after receiving an enlarged display instruction for a fourth service code, the mobile terminal can enter an enlarged display interface 802 for enlarged display of the fourth service code 804. In the enlarged display interface, the fourth service code 804 is in an enlarged display state, facilitating code scanning by the user. The fourth service code 804 can include a service code that has not been scanned and recognized by the station-entry toll terminal, and a service code that has been scanned and recognized by the station-entry toll terminal but has not been scanned and recognized by the station-exit toll terminal.

The enlarged display instruction can be generated through triggering by a user operation. For example, the user can trigger the service code that has not been scanned and recognized by the station-entry toll terminal. After detecting the trigger operation, the mobile terminal can use a service code corresponding to the trigger operation as a fourth service code; and can generate an enlarged display instruction for the fourth service code. For example, the trigger operation can include a tap operation, a double-tap operation, a press operation, a swipe operation, an operation of pressing and holding for more than a predetermined time (also referred to as a touch and hold operation), etc. For another example, the user can trigger the service code that has been scanned and recognized by the station-entry toll terminal but has not been scanned and recognized by the station-exit toll terminal. After detecting the trigger operation, the mobile terminal can use a service code corresponding to the trigger operation as a fourth service code; and can generate an enlarged display instruction for the fourth service code.

Alternatively, the enlarged display instruction can be generated after second audio information is received. Specifically, as described previously, the mobile terminal can display the specified quantity of service codes. At least one service code in the specified quantity of service codes can have a label. The label can include a first label, a second label, a third label, etc. As such, the user can input the second audio information. The mobile terminal can receive audio information that is input by a user; can recognize the second audio information to obtain a target label; can use a service code that has the target label as a fourth service code; and can generate an enlarged display instruction for the fourth service code. For example, the second audio information can be "display the service code that has been used for entry", and then the target label can be the first label "entered". For another example, the second audio information can be "display the service code that has been used for exit", and then the target label can be the second label "exited".

In some implementations of some embodiments, as described previously, the mobile terminal can display the specified quantity of service codes. At least one service code in the specified quantity of service codes can have a label. The label can include a first label, a second label, a third label, etc. As such, after receiving a label broadcast instruction for a fifth service code, the mobile terminal can broadcast a label that the fifth service code has. The fifth service code can include a service code that has been scanned and recognized by the station-entry toll terminal, but has not been scanned and recognized by the station-exit toll terminal, and a service code that has been scanned and recognized by the station-exit toll terminal.

The label broadcast instruction can be generated through triggering by a user operation. For example, the user can trigger the service code that has been scanned and recognized by the station-entry toll terminal but has not been scanned and recognized by the station-exit toll terminal. After detecting the trigger operation, the mobile terminal can use a service code corresponding to the trigger operation as a fifth service code; and can generate a label broadcast instruction for the fifth service code. For another example, the user can trigger the service code that has been scanned and recognized by the station-exit toll terminal. After detecting the trigger operation, the mobile terminal can use a service code corresponding to the trigger operation as a fifth service code; and can generate a label broadcast instruction for the fifth service code.

In some embodiments, the mobile terminal can provide the service code management interface; can receive the specified quantity that is input by the user in the service code management interface; can generate the specified quantity of service codes, where the specified quantity of service codes include the same user identification information; and can display the specified quantity of service codes. As such, when multiple persons traveling together take public transportation and one of them makes payment, the user performs the operation once so that the mobile terminal generates multiple service codes, thereby simplifying user operations and improving user experience.

Figure 2:
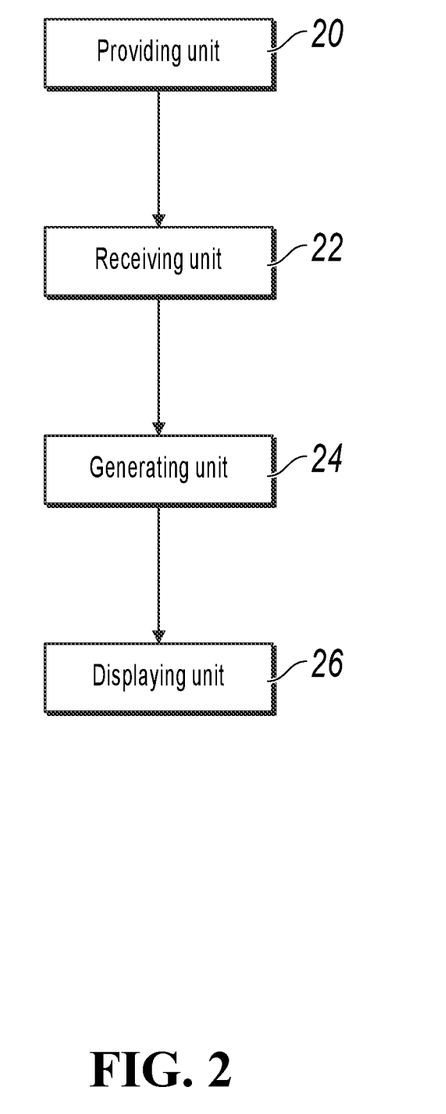
FIG. 2 is a schematic diagram illustrating a functional structure of a data processing apparatus, according to some embodiments of the present specification.

References are made to FIG. 2. Some embodiments of the present specification provide a data processing apparatus.

The data processing apparatus can include the following units: a providing unit 20, configured to provide a service code management interface; a receiving unit 22, configured to receive a specified quantity that is input by a user in the service code management interface; a generating unit 24, configured to generate the specified quantity of service codes, where the specified quantity of service codes include the same user identification information; and a displaying unit 26, configured to display the specified quantity of service codes.

Figure 3:
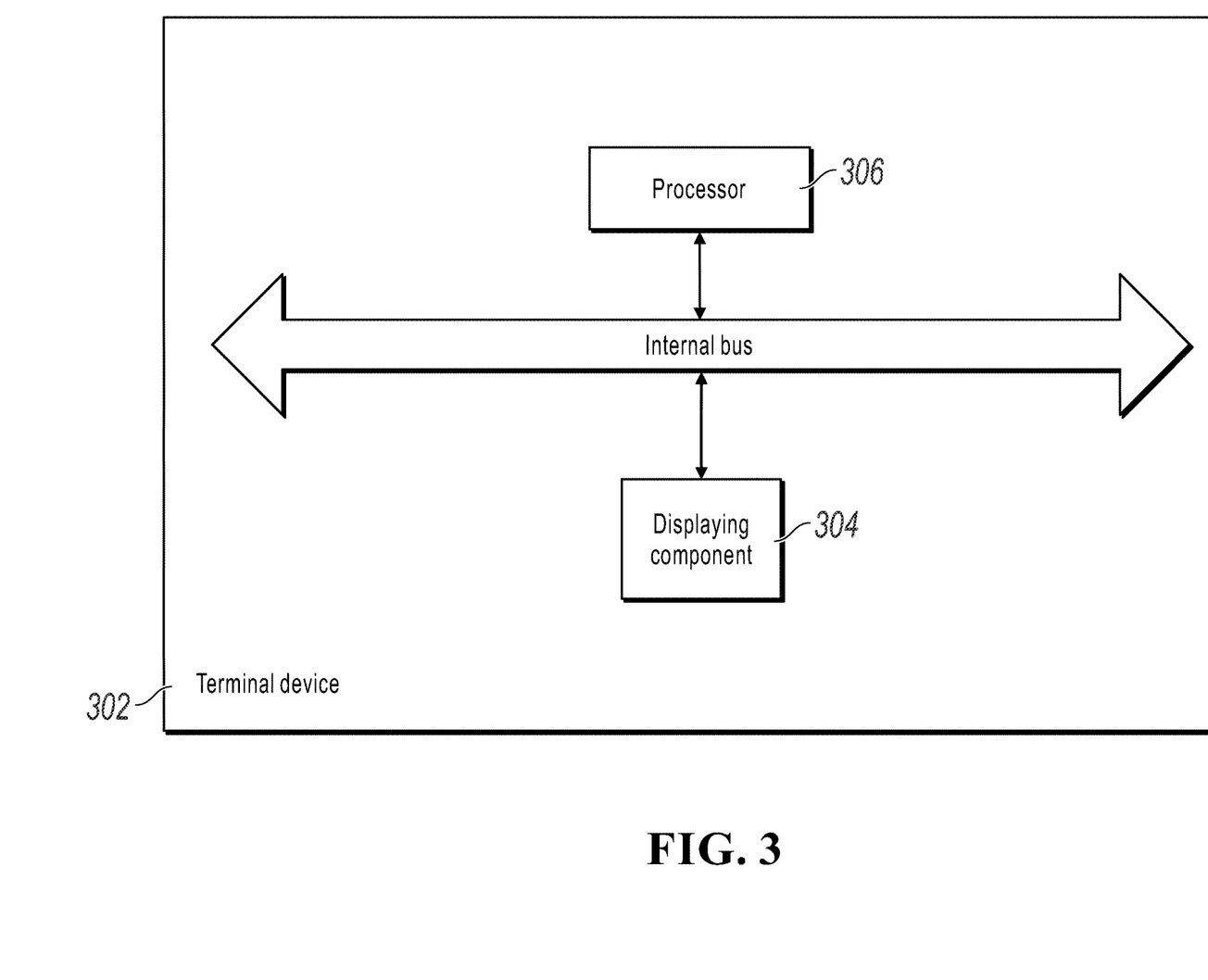
FIG. 3 is a schematic diagram illustrating a functional structure of a terminal device, according to some embodiments of the present specification.
Figure 4:
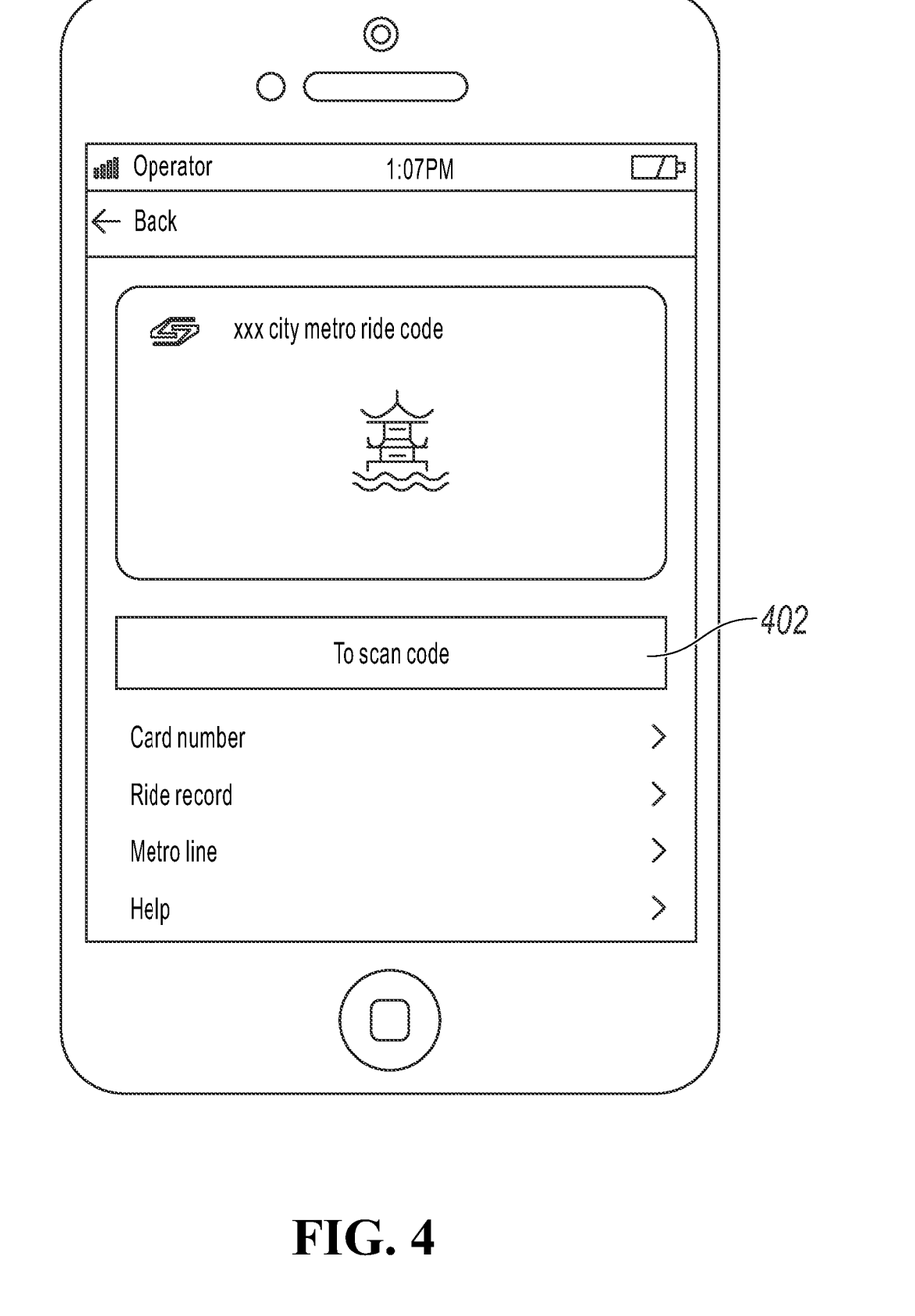
FIG. 4 is a schematic diagram illustrating an electronic metro card, according to some embodiments of the present specification.
Figure 5:
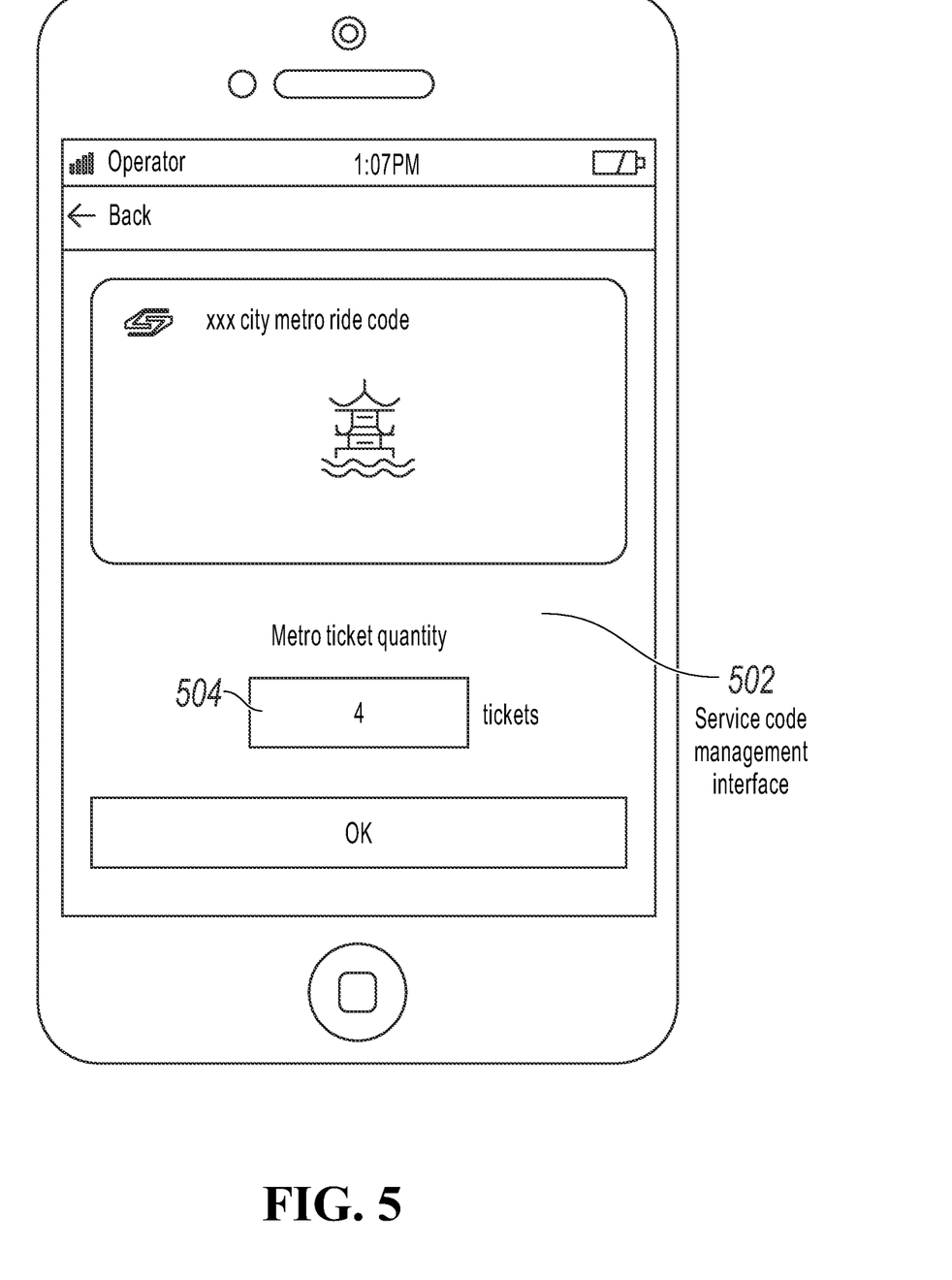
FIG. 5 is a schematic diagram illustrating a service code management interface, according to some embodiments of the present specification.
Figure 6:
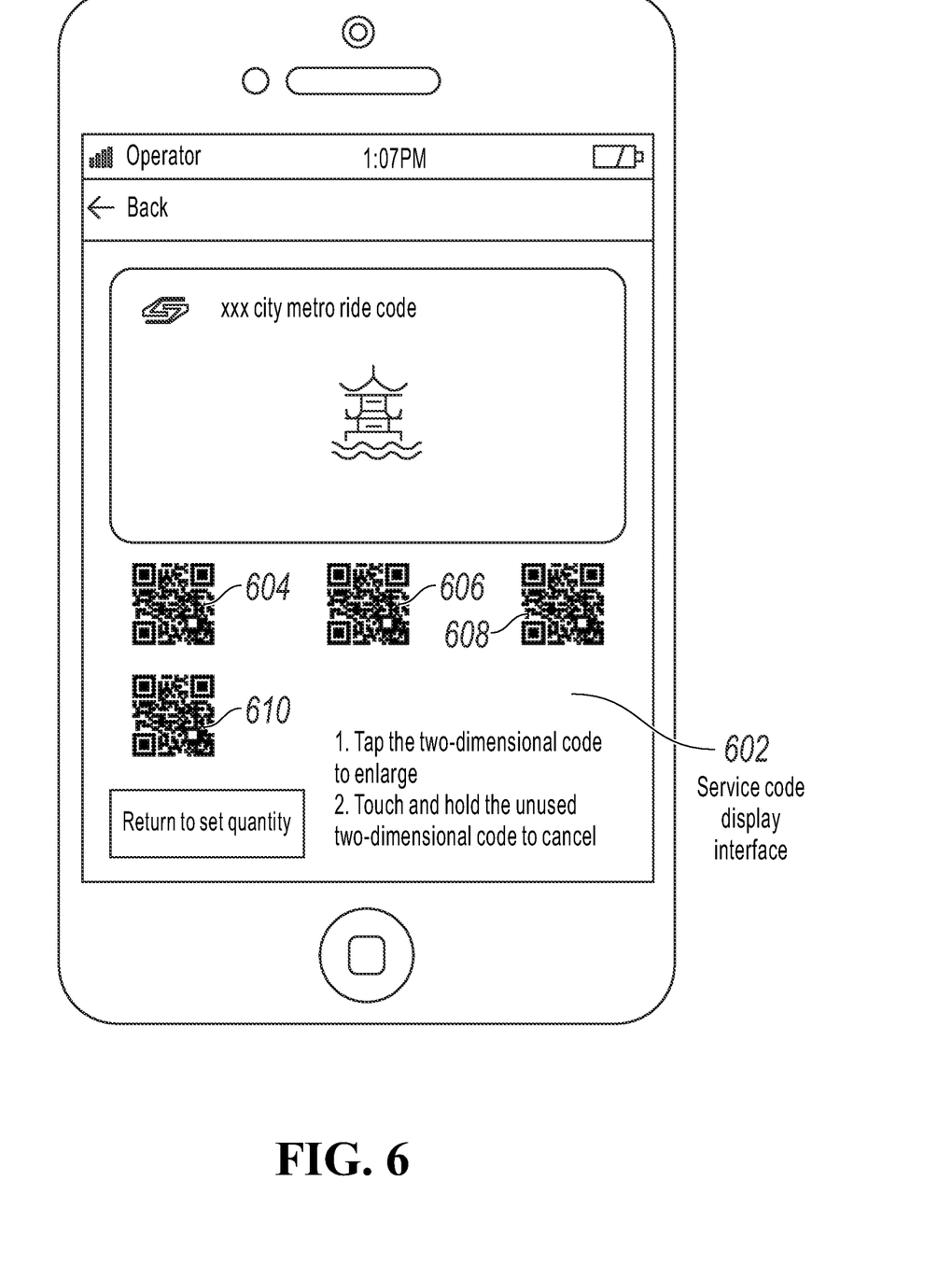
FIG. 6 is a schematic diagram illustrating a service code display interface, according to some embodiments of the present specification.

References are made to FIG. 3. Some embodiments of the present specification provide a terminal device 302. The terminal device can include a displaying component 304 and a processor 306.

In some embodiments, the displaying component 304 can include but is not limited to a liquid crystal display (LCD), a cathode ray tube (CRT) display, a light emitting diode (LED) display, etc. The displaying component 304 can be configured to display a service code management interface and a service code.

In some embodiments, the processor 306 can be implemented in any proper method. For example, the processor can take the form of, for example, a microprocessor or processor, a computer-readable medium storing computer readable program code (such as software or firmware) executable by the microprocessor or processor, a logic gate, a switch, an application specific integrated circuit (ASIC), a programmable logic controller, and an embedded microcontroller. The processor 306 can be coupled to the displaying component 304, and configured to: control the displaying component 304 to display the service code management interface; receive a specified quantity that is input by a user in the service code management interface; generate the specified quantity of service codes, where the specified quantity of service codes include the same user identification information; and control the displaying component 304 to display the specified quantity of service codes.

Some embodiments of the present specification are described in a progressive way. For same or similar parts of some embodiments, mutual references can be made to some embodiments. Each embodiment focuses on a difference from the other embodiments. Particularly, data processing apparatus embodiments and terminal device embodiments are basically similar to method embodiments, and therefore are described briefly. For related parts, references can be made to related descriptions in the method embodiments.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, at present, instead of manually manufacturing an integrated chip, this type of programming is mostly implemented by using "logic compiler" software. The programming is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog2 are most commonly used. A person skilled in the art should also understand that a hardware circuit that implements a logical method procedure can be readily obtained once the method procedure is logically programmed by using the some described hardware description languages and is programmed into an integrated circuit.

The system, apparatus, module, or unit illustrated in the previous embodiments can be implemented by using a computer chip or an entity, or can be implemented by using a product having a certain function. A typical implementation device is a computer. Specifically, for example, the computer can be a personal computer, a laptop computer, a cellular phone, a camera phone, a smart phone, a personal digital assistant, a media player, a navigation device, an e-mail device, a game console, a tablet computer, a wearable device, or any combination of these devices.

It can be seen from the descriptions of the implementations that a person skilled in the art can clearly understand that the present specification can be implemented by using software and a necessary general hardware platform. Based on such an understanding, the technical solutions in the present specification essentially or the part contributing to the existing technology can be implemented in a form of a software product. The computer software product can be stored in a storage medium, such as a ROM/RAM, a magnetic disk, or an optical disc, and includes some instructions for instructing a computer device (can be a personal computer, a server, or a network device) to perform the methods described in some embodiments or in some parts of some embodiments of the present specification.

The present specification can be applied to many general-purpose or special-purpose computer system environments or configurations, for example, a personal computer, a server computer, a handheld device or a portable device, a tablet device, a multi-processor system, a microprocessor-based system, a set-top box, a programmable consumer electronic device, a network PC, a minicomputer, a mainframe computer, and a distributed computing environment including any one of the previous systems or devices.

The present specification can be described in the general context of computer-executable instructions, for example, a program module. Generally, the program module includes a routine, a program, an object, a component, a data structure, etc. executing a specific task or implementing a specific abstract data type. The present specification can also be practiced in distributed computing environments. In the distributed computing environments, tasks are performed by remote processing devices connected through a communications network. In a distributed computing environment, the program module can be located in both local and remote computer storage media including storage devices.

Although the present specification is described by using some embodiments, a person of ordinary skill in the art knows that many variations of the present specification can be made without departing from the spirit of the present specification. It is expected that the appended claims include these variations without departing from the spirit of the present specification.

What is claimed is:

1. A computer-implemented method, comprising:
    providing, by one or more processing devices, a service code management interface;
    receiving, by the one or more processing devices, a user input specifying a quantity of a plurality of scannable service codes in the service code management interface;
    generating, by the one or more processing devices, the plurality of scannable service codes, wherein each of the plurality of scannable service codes comprises a same user identification information;
    determining, by the one or more processing devices, that a first service code of the plurality of scannable service codes has been scanned at a first toll terminal;
    generating and displaying, by the one or more processing devices, a first label that indicates that the first service code is in a first payment status on an account associated with the user identification information;
    determining, by the one or more processing devices, that a second service code of the plurality of scannable service codes has been scanned at a second toll terminal; and
    generating and displaying, by the one or more processing devices, a second label that indicates that the second service code is in a second payment status on the account.

2. The computer-implemented method of claim 1, wherein
    the first payment status comprises a payment opening status that indicates that the account starts being charged, and
    the second payment status comprises a payment end status that indicates that a final payment amount is to be deducted from the account.

3. The computer-implemented method of claim 1, wherein the first toll terminal is located at an entry station, the second toll terminal is located at an exit station.

4. The computer-implemented method of claim 1, wherein each scannable service code further comprises order identification information, the first label is generated after tolling start information is received, and the tolling start information comprises the order identification information in the first service code.

5. The computer-implemented method of claim 1, wherein each scannable service code further comprises order identification information; the second label is generated after payment result information is received; and the payment result information comprises the order identification information in the second service code.

6. The computer-implemented method of claim 1, further comprising:
    after receiving a third label generation instruction for a third service code of the plurality of scannable service codes, generating a third label for the third service code, wherein the third label is used to indicate that the third service code is in a canceled state; and
    displaying the third label.

7. The computer-implemented method of claim 1, further comprising:
    after receiving an enlarged display instruction for a fourth service code of the plurality of scannable service codes, entering an enlarged display interface for enlarged display of the fourth service code.

8. The computer-implemented method of claim 1, further comprising:
   after receiving a label broadcast instruction for a fifth service code of the plurality of scannable service codes, broadcasting a label associated with the fifth service code.

9. The computer-implemented method of claim 1, further comprising:
   displaying, on a user mobile terminal, by the one or more processing devices, the plurality of scannable service codes.

10. The computer-implemented method of claim 1, wherein each scannable service code further comprises order identification information; and the order identification information in different scannable service codes is different.

11. A non-transitory, computer-readable medium storing one or more instructions executable by a computer system to perform operations comprising:
   providing a service code management interface;
   receiving a user input specifying a quantity of a plurality of scannable service codes in the service code management interface;
   generating the plurality of scannable service codes, wherein each of the plurality of scannable service codes comprises a same user identification information;
   determining that a first service code of the plurality of scannable service codes has been scanned at a first toll terminal;
   generating and displaying a first label that indicates that the first service code is in a first payment status on an account associated with the user identification information;
   determining that a second service code of the plurality of scannable service codes has been scanned at a second toll terminal; and
   generating and displaying a second label that indicates that the second service code is in a second payment status on the account.

12. The non-transitory, computer-readable medium of claim 11, wherein
   the first payment status comprises a payment opening status that indicates that the account starts being charged, and
   the second payment status comprises a payment end status that indicates that a final payment amount is to be deducted from the account.

13. The non-transitory, computer-readable medium of claim 11, wherein each scannable service code further comprises order identification information, the first label is generated after tolling start information is received, and the tolling start information comprises the order identification information in the first service code.

14. The non-transitory, computer-readable medium of claim 11, wherein each scannable service code further comprises order identification information; the second label is generated after payment result information is received; and the payment result information comprises the order identification information in the second service code.

15. The non-transitory, computer-readable medium of claim 11, wherein the operations further comprise:
   after receiving a third label generation instruction for a third service code of the plurality of scannable service codes, generating a third label for the third service code, wherein the third label is used to indicate that the third service code is in a canceled state; and
   displaying the third label.

16. The non-transitory, computer-readable medium of claim 11, wherein the operations further comprise:
   after receiving an enlarged display instruction for a fourth service code of the plurality of scannable service codes, entering an enlarged display interface for enlarged display of the fourth service code.

17. The non-transitory, computer-readable medium of claim 11, wherein the operations further comprise:
   after receiving a label broadcast instruction for a fifth service code of the plurality of scannable service codes, broadcasting a label associated with the fifth service code.

18. The non-transitory, computer-readable medium of claim 11, wherein each scannable service code further comprises order identification information; and the order identification information in different scannable service codes is different.

19. A computer-implemented system, comprising:
   one or more computers; and
   one or more computer memory devices interoperably coupled with the one or more computers and having tangible, non-transitory, machine-readable media storing one or more instructions that, when executed by the one or more computers, perform one or more operations comprising:
   providing a service code management interface;
   receiving a user input specifying a quantity of a plurality of scannable service codes in the service code management interface;
   generating the plurality of scannable service codes, wherein each of the plurality of scannable service codes comprises a same user identification information;
   determining that a first service code of the plurality of scannable service codes has been scanned at a first toll terminal;
   generating and displaying a first label that indicates that the first service code is in a first payment status on an account associated with the user identification information;
   determining that a second service code of the plurality of scannable service codes has been scanned at a second toll terminal; and
   generating and displaying a second label that indicates that the second service code is in a second payment status on the account.

20. The computer-implemented system of claim 19, wherein
   the first payment status comprises a payment opening status that indicates that the account starts being charged, and
   the second payment status comprises a payment end status that indicates that a final payment amount is to be deducted from the account.

* * * * *